United States Patent [19]

Zatezalo

[11] Patent Number: 4,586,264

[45] Date of Patent: May 6, 1986

[54] METHODS FOR MEASURING ALIGNMENT OF COUPLED SHAFTS

[75] Inventor: John M. Zatezalo, Pittsburgh, Pa.

[73] Assignee: Industrial Maintenance Systems, Inc., Pittsburgh, Pa.

[21] Appl. No.: 687,722

[22] Filed: Dec. 31, 1984

[51] Int. Cl.[4] ............................................. G01B 5/25
[52] U.S. Cl. .................................... 33/412; 33/180 R
[58] Field of Search .................. 33/412, 181 R, 180 R

[56] References Cited

U.S. PATENT DOCUMENTS

| | | | |
|---|---|---|---|
| 2,833,051 | 5/1958 | Cunningham | 33/180 R |
| 3,244,392 | 4/1966 | Sheets | 33/180 R |
| 3,525,158 | 8/1970 | Torlay | 33/412 |
| 4,367,594 | 1/1983 | Murray, Jr. | 33/412 |
| 4,463,438 | 7/1984 | Zatezalo | 15/46 |

OTHER PUBLICATIONS

IMS Operations Manual, 1980, revised edition.

Primary Examiner—Willis Little
Attorney, Agent, or Firm—Buell, Ziesenheim, Beck & Alstadt

[57] ABSTRACT

The specificatin discloses several methods of measuring the alignment of coupled shafts preferably by suspending gauges over the coupled shafts and taking gauge readings, measuring certain distances of the gauges from predetermined points such as the coupling centerline, inserting those values in given equations and solving the equations. The solutions are then compared to a predetermined range of acceptable values to determine if the coupled shafts are in an acceptable alignment.

18 Claims, 8 Drawing Figures

METHODS FOR MEASURING ALIGNMENT OF COUPLED SHAFTS

FIELD OF THE INVENTION

The invention relates to methods which are used to determine the relative position of two interconnected shafts which will indicate if there is an acceptable alignment between the two shafts.

DESCRIPTION OF THE PRIOR ART

Wherever two rotating shafts are coupled together it is important that their axis of rotation be the same. Misalignment of the shafts causes vibrations which cause excessive wear and destruction of couplings, bearings, seals, gears and other components. Today, misalignment is the primary cause of more than 50 percent of all rotating machinery failures in many industries.

There are well known equations which can be used to determine how to adjust the position of two coupled machines so that the interconnected shafts between them are properly aligned. To use the equations one must make certain measurements, insert those measurements in the equations and solve them. The solutions will tell the user how much and in what direction to move the machines so that the coupled shafts will be properly aligned.

In my U.S. Pat. No. 4,463,438 I disclose a calculator which will tell any mechanic how to align coupled machinery. This calculator is programed with the equations one must use to determine how to adjust the position of two coupled machines so that the interconnected shafts between them are properly aligned. Through a unique visual display the calculator tells the mechanic what measurements to make and in what order to make them. The mechanic simply enters those measurements in the sequence specified by the calculator. The computer remembers the equations and performs the calculations. Then the device tells the user how much to shim the front and back feet of one of the coupled machines so that the coupled shafts will be properly aligned.

My calculator tells the mechanic how to shim the machine to obtain a perfect alignment. However, in practice a perfect alignment may not be possible to achieve. The mechanic may not have the right size shims. The measurements he has taken may be slightly wrong. Or, the mechanic may not have the time or patience to make all of the needed adjustments.

Recognizing that a perfect alignment will not be obtained, the art has struggled to define acceptable alignments within set tolerances. Many have suggested that one could define those tolerances in terms of the relative positions of the coupled shafts.

Attempts have been made to set tolerances in terms of readings shown on gauges attached to the coupled shafts. Problems developed when people tried to define acceptable limits in terms of these readings. Any mechanic could obtain several different readings on any given alignment depending upon where he took his measurements. In the event that he obtained unacceptable gauge readings, he could move the gauges, take new readings at other points and obtain acceptable values. Almost any alignment could be shown to meet prior art specifications by moving the gauges. Furthermore, when people did define tolerances in terms of gauge readings they found that a different set of tolerances was needed for each type of machine. Given readings on a large machine would correspond to an acceptable alignment, but the same readings on a small machine would not indicate an acceptable alignment.

BRIEF DESCRIPTION OF THE PREFERRED EMBODIMENTS

I have developed several methods for measuring alignment of coupled shafts which overcome the problems of prior art techniques. In all of my methods I establish reference points relative to the coupled shafts where readings are to be taken, preferably with gauges mounted on the shafts. Then I measure the distances between gauges and the coupling centerline. These measurements and readings are applied to formulae I have developed to determine alignment in terms of what I call "angularity" and "offset at the coupling centerline". For convenience, I refer to "offset at the centerline" merely as "offset". These values are then compared to a predetermined tolerance range to determine if the offset and angularity values are acceptable. If the values are not acceptable, then the feet of the machine must be shimmed to create a proper alignment.

The tolerance levels are determined by experience. It is known that the greater the misalignment the shorter the life of the coupling and coupled machinery. I, or the user, select the maximum amount of misalignment which is acceptable. The selected level is based upon the machinery and coupling life known from experience to be associated with that amount of misalignment and the lifespan which one wants to achieve for the machinery. After that level of misalignment is selected I use my methods to assign an offset value and an angularity value to it. Those values are then used as tolerances against which all other alignments are tested.

A key feature of my methods involves taking measurements from the centerline of the coupling. I selected that location because I found that the values I obtain for offset and angularity more directly correspond to the level of vibration and resulting damage in an improper alignment.

A principal advantage of my methods is that for a given situation the offset and angularity value will not change until one of the coupled shafts is moved. It is impossible to achieve acceptable values by simply manipulating the gauges.

Another advantage is that tolerance levels for offset and angularity can be set which are applicable to a class of machines. It is not necessary to set a tolerance for each individual machine.

Other details, objects and advantages of the invention will become apparent as a description of a present preferred embodiment of the invention proceeds.

DESCRIPTION OF THE DRAWINGS

In the accompanying drawings, I have shown illustrative diagrams of prior art practice and my present perferred methods for determining shaft alignment in which.

DETAILED DESCRIPTION OF A PRIOR ART METHOD FOR MEASURING SHAFT POSITIONS

Figure 1:
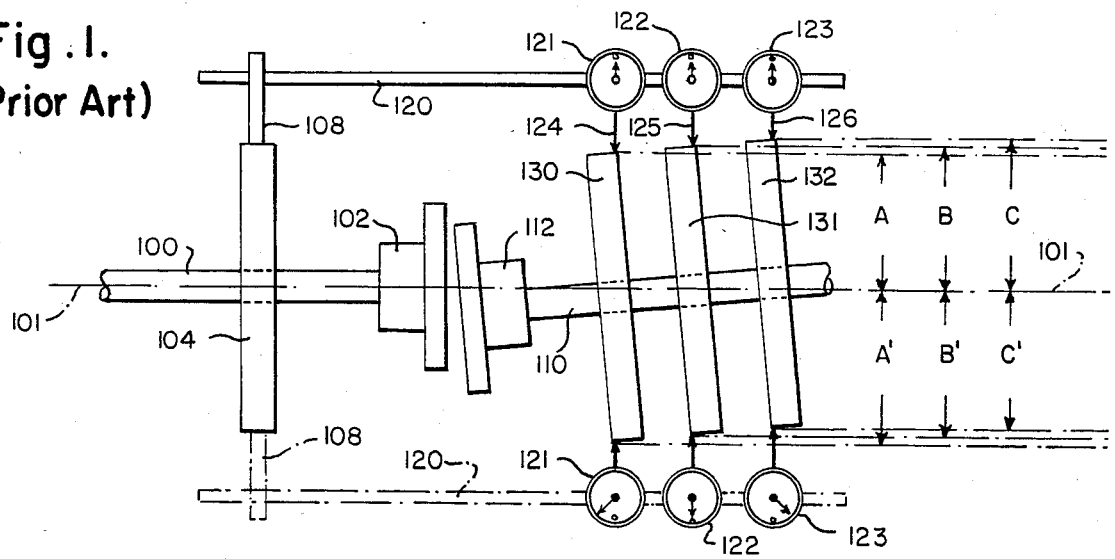
FIG. 1 is a diagram illustrating prior art practice of two misaligned shafts coupled by a flexible coupling and having gauges attached thereto.

Referring to FIG. 1, I have illustrated two shafts 100 and 110 which are severely misaligned. These shafts are coupled through a flexible coupling having left half 102 and right half 112. A clamp 104 is mounted on shaft 100 perpendicular to the shaft 100. A pin 108 extends from clamp 104 and holds rod 120. Rod 120 runs roughly parallel to shaft 100 and extends over shaft 110. A single gauge such as the "Last Word" dial indicator would normally be positioned on the end of rod 120. That gauge would abut shaft 110 or the top of a clamp mounted perpendicularly on shaft 110 so that the top of the clamp is parallel to the shaft 110. In the past people have tried to define some range of gauge readings which would correspond to an acceptable alignment. FIG. 1 illustrates why those attempts have been fruitless. Three gauges 121, 122 and 123 are mounted on the end of rod 120. Pins 124, 125 and 126 extend from each gauge and abut the top of one of three identical clamps 130, 131 and 132 mounted on shaft 110. The tops of these clamps are parallel to shaft 110. Notice that the distance which pin 124 extends from gauge 121 is more than the length of pin 125 which is longer than pin 126. The ends of these pins are also at different distances from the center line 101 of shafts 100. These distances are indicated by letters A, B and C. Thus, if a single gauge were used and readings are taken at points corresponding to gauges 121, 122 and 123, three different readings would be obtained. These gauges are all set at zero to illustrate what happens when the gauges are moved about the shaft. When the gauges are rotated 180° to the position shown in dotted lines the readings will change again as shown by the gauge arrows. Gauge 121 has moved in a positive direction; gauge 122 remained at zero; and gauge 123 moved in the negative direction. The change occurred because the tips of pins 124 and 126 are at different distances from center line 101. The distance A of pin 124 has increased to distance A'. Distance B equals distance B'. Distance B has not changed even though pin 125 has moved to the opposite edge of clamp 131. The distance C of pin 126 has decreased to distance C'. It should be apparent that similar gauge readings would result if the readings were taken directly on shaft 110 and clamps 130, 131 and 132 were not used. The gauge readings depend upon the position of the gauge along the shaft. Thus, it is useless to set alignment standards based solely on gauge readings.

DESCRIPTION OF THE PREFERRED METHODS

In FIGS. 2 through 7 I have illustrated two shafts 2 and 12 coupled together by a flexible coupling. The coupling is comprised of a left half 4 and right half 14 bolted together. Mounted above shafts 2 and 12 are gauges, such as gauges 6 and 16 in FIG. 2. These gauges are suspended from rods 20 which extend from two piece clamps 22 and 24.

Figure 3:
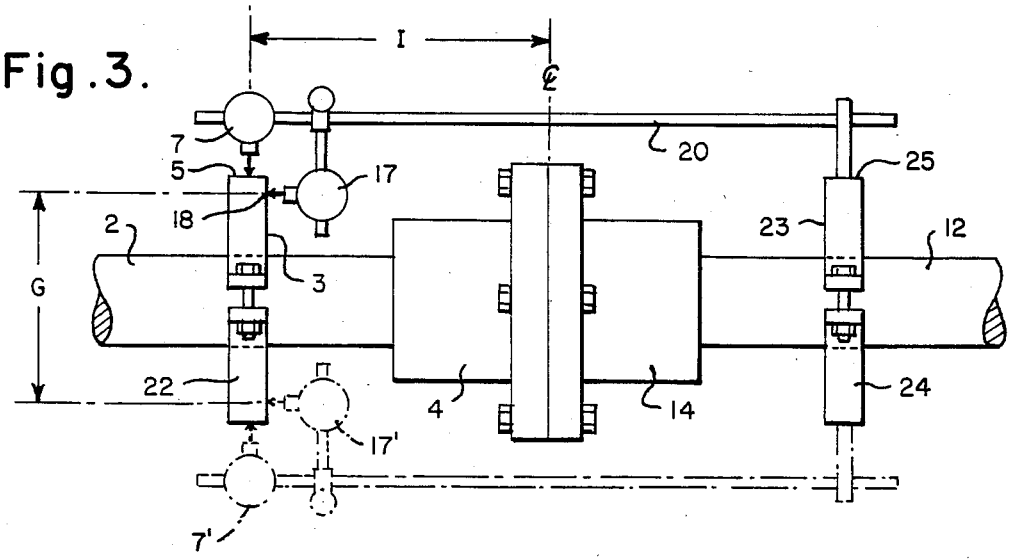
FIG. 3 is a diagram of two coupled shafts with gauges mounted thereon to illustrate a second preferred method of measuring the alignment of two coupled shafts.

The procedure which I use to take gauge readings on all of my preferred methods involves first positioning the gauges as shown in the drawings. Next I "zero" the gauges. That is, I set the gauges to zero and then adjust the setting to compensate for sag. Sag is the deflection of rod 20 from the horizontal. The amount of bending will depend upon the length and strength of rod 20. In many cases, this bending may be large enough to cause a significant error in the dial indicator readings. One can determine the amount of sag by mounting the hardware (e.g., clamp 22, rod 20, gauge 6 and clamp 24) on a straight piece of pipe, setting the gauge to zero, rotating the pipe and attached hardware 180°, and reading the gauge. That gauge reading is the sag for that hardware. After I have "zeroed" the gauges I rotate the shafts 180° and take my reading. In FIG. 3, for example, gauges 7 and 17 would be "zeroed". Then the shafts 2 and 12 are rotated so the gauges are in the position of 7' and 17'. My gauge readings are the numbers indicated on gauges 7' and 17'. One could also "zero" gauges 7' and 17' then take readings of the position of gauges 7 and 17. Both techniques will give the same numerical gauge reading except that the signs will be different.

It should also be understood that one can use my methods for both solid and flexible couplings. However, if a solid coupling is present one must unbolt the coupling to allow the shafts 2 and 12 to assume their relative positions. It is not necessary to unbolt flexible couplings.

Figure 2:
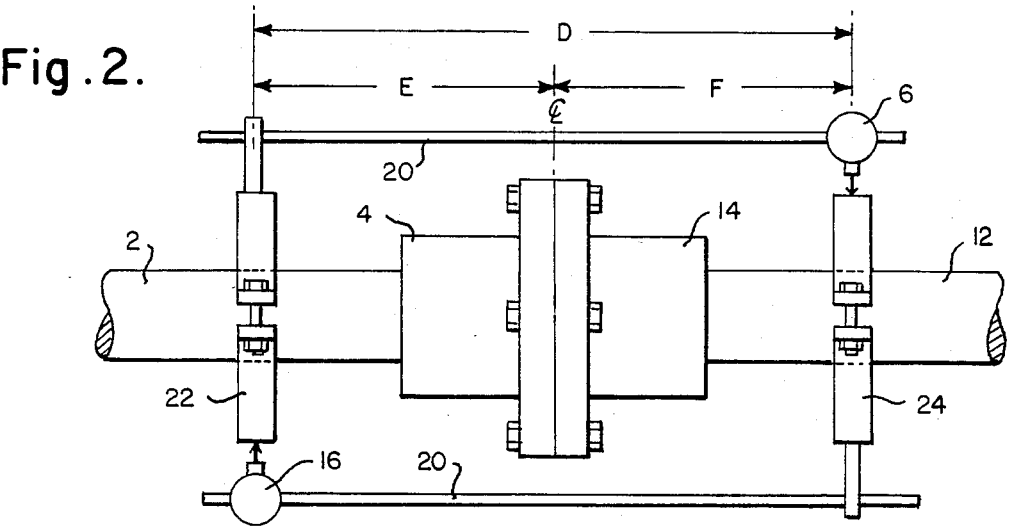
FIG. 2 is a diagram of two coupled shafts with gauges mounted thereon to illustrate a first present preferred method of determining the alignment of two coupled shafts.

To determine angularity of shafts 2 and 12 in FIG. 2, I measure the distance between gauges 6 and 16 which I have identified by the letter D. Then I read gauges 6 and 16 to get readings $r_6$ and $r_{16}$. Then I apply these values to the following formula:

$$\text{Angularity} = \frac{r_6 + r_{16}}{2D}$$

To find the offset of shafts 2 and 12 I define a centerline through the coupling. Then I measure the distance E of gauge 16 from the centerline and the distance F of gauge 6 from the centerline. Using those measurements I compute offset from the following formula:

$$\text{Offset} = \frac{r_6}{2} - \frac{(r_6 + r_{16}) E}{2D}$$

Or, I can use the formula:

$$\text{Offset} = \frac{(r_6 + r_{16}) F}{2D} - \frac{r_{16}}{2}$$

Next, I compare the angularity and offset values to the acceptable ranges for these items. If the values are unacceptable I shim one of the machines which causes either shaft 2 or 12 to move. Then I repeat my procedure until acceptable readings are obtained.

A second preferred method is illustrated in FIG. 3. Again I have illustrated two shafts 2 and 12 coupled together. Shaft 2 extends from a stationary machine and shaft 12 is from a machine which is to be shimmed. The coupling is comprised of two halves 4 and 14 bolted together. Two piece clamps 22 and 24 are fitted over each shaft. These clamps are sized so that their vertical surfaces 3 and 23 are perpendicular to the shaft to which the clamp is attached and the horizontal top surfaces 5 and 25 are parallel to the shaft. To calculate angularity I first mount gauges 7 and 17 as shown in FIG. 3. Then I determine the diameter G of a circle through which gauge 17 would travel if rotated around shaft 2. This diameter can be determined by marking a point 18 where gauge 17 abuts the top half of clamp 22. Next I rotate the shafts 180° so that the gauges are in the positions 7' and 17' shown in chain line. Then I measure the distance G from point 18 to the push rod of clamp 17'. Finally I take a face reading $r_{17}$ on gauge 17. Angularity can then be computed by dividing reading $r_{17}$ by distance G:

$$\text{Angularity} = r_{17}/G$$

Figure 4:
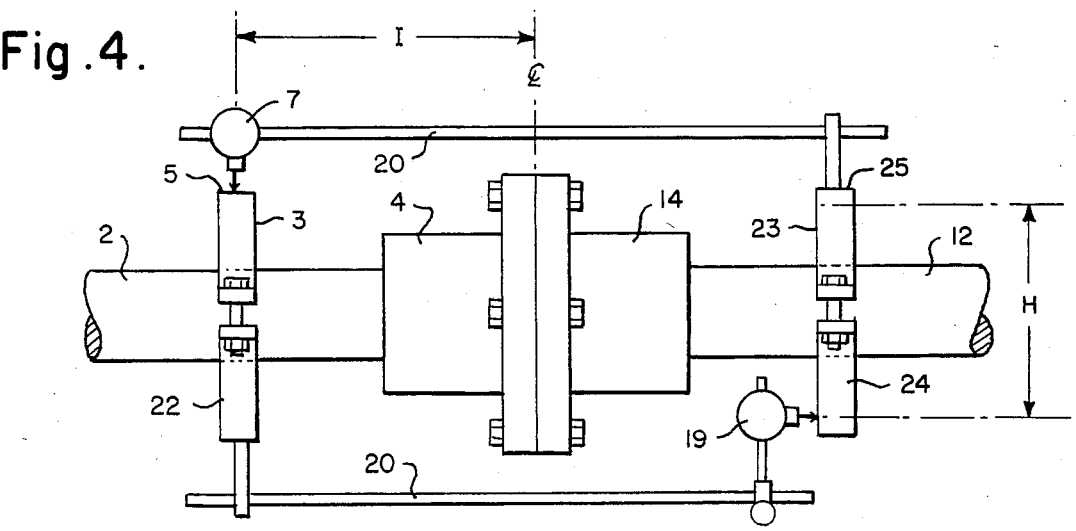
FIG. 4 is a diagram of two coupled shafts with gauges mounted thereon to illustrate a third preferred method of determining the alignment of two coupled shafts.

Alternatively I can take my face reading on clamp 24 using a gauge 19 positioned as shown in FIG. 4. Again I measure the diameter of travel H of gauge 19 and solve the equation:

$$\text{Angularity} = r_{19}/H$$

To compute offset using the gauge setup of FIG. 3, I define a centerline through the coupling. Then I measure the distance I of gauge 7 from the centerline and take a reading $r_7$ on gauge 7. Offset can then be calculated using these measurements and those taken to compute angularity from the following equation:

$$\text{Offset} = \frac{r_7}{2} - \frac{r_{17}I}{G}$$

Again, I can calculate offset by taking a face reading $r_{19}$ on clamp 24 using the set-up shown in FIG. 4. I also need the diameter of travel H of gauge 19. Using those figures offset is calculated as follows:

$$\text{Offset} = \frac{r_7}{2} - \frac{r_{19}I}{H}$$

Figure 5:
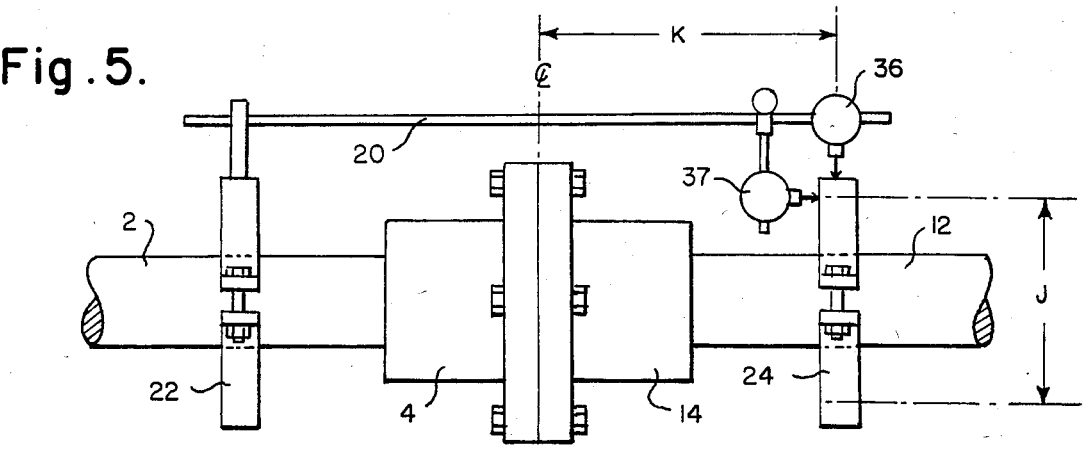
FIG. 5 is a diagram of two coupled shafts with gauges mounted thereon to illustrate a fourth preferred method of determining the alignment of two coupled shafts.

Another preferred method utilizes the gauge arrangements of FIG. 5. Two shafts 2 and 12 are shown coupled together with coupling halves 4 and 14. Shaft 2 extends from a stationary machine and shaft 12 is from a machine to be shimmed. Clamps 22 and 24 are mounted on the shafts. These clamps and rod 20 support gauges 36 and 37 in the positions shown. In this method I take a rim reading $r_{36}$ at gauge 36 and a face reading $r_{37}$ using gauge 37. I also determine the diameter of travel J of gauge 37. Then I can calculate angularity by dividing the gauge reading $r_{37}$ by the diameter of travel E.

$$\text{Angularity} = r_{37}/J$$

To find the offset I need a reading $r_{36}$ from gauge 36 and the distance K of gauge 36 from the coupling centerline. Knowing those values I find offset by solving these equations:

$$\text{Offset} = \frac{r_{37}K}{J} - \frac{r_{36}}{2}$$

Next, I compare the angularity and offset values to the acceptable ranges for these items. If the values are acceptable I am finished. If not, I shim one machine and repeat the procedure.

Figure 6:
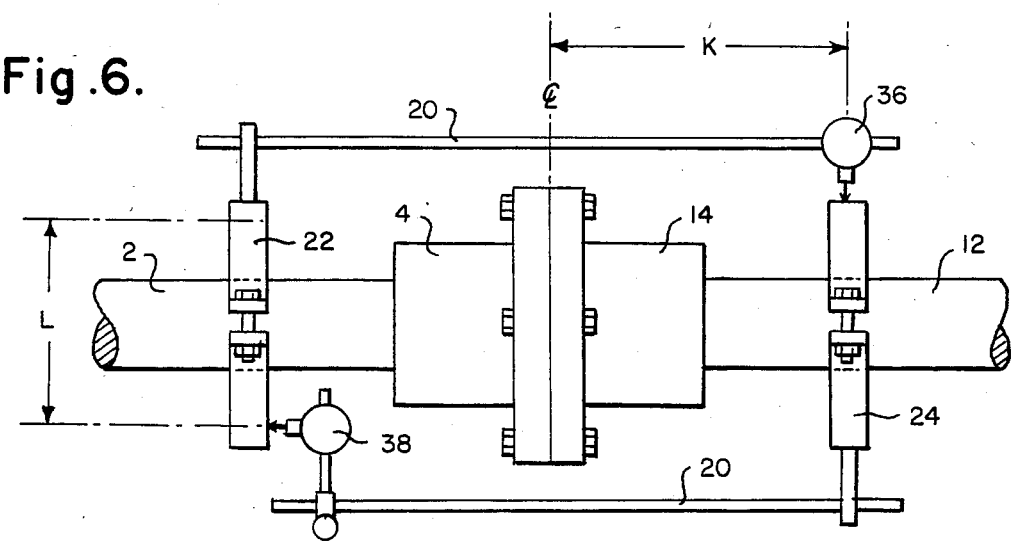
FIG. 6 is a diagram of two coupled shafts with gauges mounted thereon to illustrate a fifth preferred method of determining the alignment of two coupled shafts.

A final preferred method utilizes the gauge arrangements of FIG. 6. Two shafts 2 and 12 are shown coupled together with coupling halves 4 and 14. Shaft 2 extends from a stationary machine and shaft 12 is from a machine to be shimmed. Once again clamps 22 and 24 are mounted on the shafts. These clamps and rods 20 support gauges 36 and 38 in the positions shown. In this method I take a rim reading $r_{36}$ at gauge 36 and a face reading $r_{38}$ using gauge 38. I also determine the diameter of travel L of gauge 38. Then I can calculate angularity by dividing the gauge reading $r_{38}$ by the diameter of travel L.

$$\text{Angularity} = r_{38}/L$$

To find the offset I need a reading $r_{36}$ from gauge 36 and the distance K of gauge 36 from the coupling centerline. Knowing those values I find offset by solving these equations:

$$\text{Offset} = \frac{r_{38}K}{L} - \frac{r_{36}}{2}$$

Next I compare the angularity and offset values to the acceptable ranges for these items. If the values are acceptable I am finished. If not, I shim one machine and repeat the procedure.

In FIGS. 2 through 6, I have illustrated clamps 22 and 24 against which gauge readings are taken because I prefer to use these clamps. But, it should be recognized that the gauge readings could be taken directly from the coupled shafts or the coupling. This can readily be seen by comparing FIG. 7 to FIGS. 5 and 6.

Figure 7:
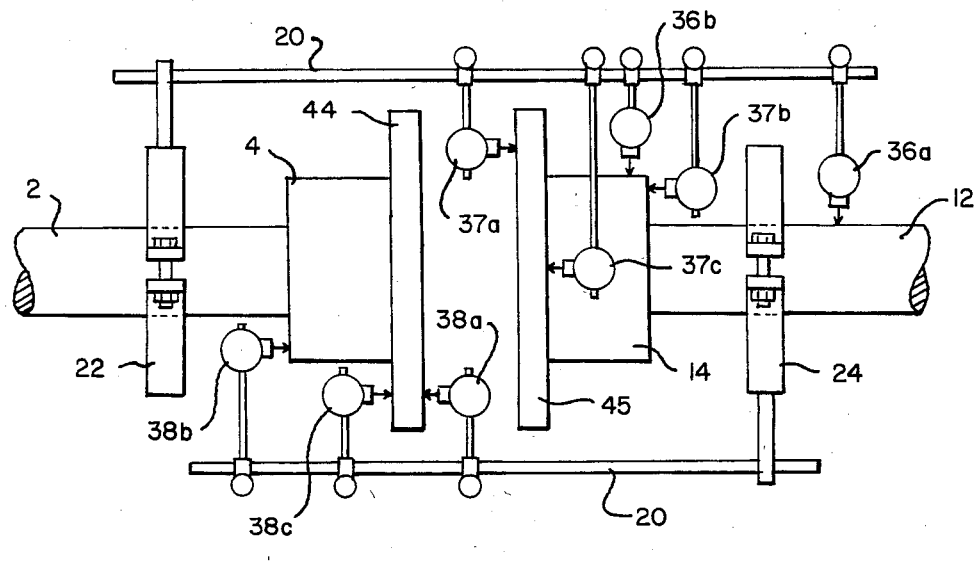
FIG. 7 is a diagram of two coupled shafts with gauges mounted thereon to illustrate how gauge readings comparable to those taken in FIGS. 2 thru 6 can be taken on the shaft and coupling.

In FIG. 7 I have illustrated two coupled shafts 2 and 12 connected by a coupling having left half 4 and right half 14. Unlike FIGS. 2 thru 6 the bolts have been removed from the coupling and the coupling halves 4 and 14 are separated. When flexible couplings are used one can easily separate coupling collars 44 and 45. After the collars are separated their gauge readings can be taken on the collar faces which abut one another.

In all of my methods illustrated in FIGS. 2 thru 6 the gauges are positioned generally in the locations of gauges 36, 37 and 38 in FIGS. 5 and 6. Gauge 19 of FIG. 4 is comparable to gauge 37 in FIG. 5 rotated 180°. Gauge 36 which takes readings over shaft 12 in FIGS. 5 and 6 is comparable to gauge 7 in FIGS. 3 and 4 and gauge 16 in FIG. 2 which take readings over shaft 2. If one wished to take gauge readings on a shaft or the coupling, the gauges could be positioned as shown in FIG. 7. Gauge 36a takes a shaft reading comparable to the clamp reading of gauge 36 in FIGS. 5 and 6 since the top of the clamp 24 is parallel to the shaft 12. Gauge 36b is positioned over a portion of the coupling parallel to shaft 12 for a coupling reading comparable to a clamp reading from gauge 36. For convenience I show gauge readings only over shaft 12 in FIG. 7. Shaft and coupling readings could also be taken over shaft 2 when appropriate. Gauges 37a and 38a are placed for coupling readings comparable to a clamp reading from gauge 37 in FIG. 5 and gauge 38 in FIG. 6. Gauge positions 37b and 38c could also be used to obtain readings comparable to those from gauge 37. However, if gauge 37b or 37c is used the sign of the gauge reading must be changed. A reading of −0.12 on gauge 37b or 37c is equivalent to a +0.12 reading on gauge 37 or 37a. To achieve coupling readings comparable to a reading from gauge 38 in FIG. 6 one may use gauge positions 38a, 38b or 38c. Again, if position 38b or 38c is used the sign of the gauge reading must be changed for the value to be equivalent to a reading from gauge 38 or 38a.

The accuracy of methods using coupling readings depends upon the degree to which the faces or edges of the coupling against which the gauge abuts are parallel or perpendicular to the shaft. Many couplings are castings having rough surfaces which most mechanics would consider to be unsuitable for taking gauge readings. Yet, even in those couplings, the abutting faces (adjacent to gauges 37a and 38a in FIG. 7) are smooth. Some couplings have finished surfaces. Thus, the mechanic may choose to use these smooth or finished surfaces. But, this choice should be made with caution. In many instances, a face or edge may appear to be roughly parallel or perpendicular to the shaft when in fact it is not. In those situations coupling readings will be less accurate than clamp readings. Nevertheless, the user may still wish to take coupling readings believing that those readings are "good enough". He may use those readings to practice my methods. I, however, prefer to take clamp readings as shown in FIGS. 2 thru 6.

Figure 8:
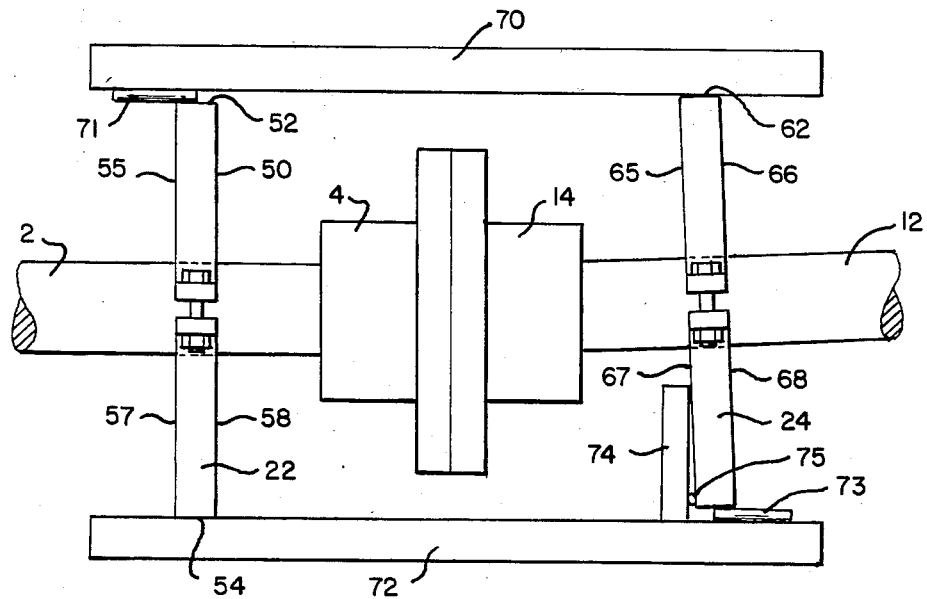
FIG. 8 is a diagram of two coupled shafts illustrating how readings can be taken with a straight edge and feeler gauge.

Although I prefer to use indicator gauges, it is also possible to take readings using a straight edge and feeler gauges. This technique is shown in FIG. 8. There I have shown a first shaft 2 and a second shaft 12 coupled together with a flexible coupling. The coupling consists of two halves 4 and 14. I have attached clamp 22 to shaft 2 for ease of measurement. Clamp 22 is attached so that the top face 52 and bottom face 54 are parallel to shaft 2. Furthermore, side faces 55, 56, 57 and 58 are perpendicular to shaft 2. Clamp 24 is attached to shaft 12 in a similar manner. Faces 62 and 64 are parallel to shaft 12. Faces 65, 66, 67 and 68 are perpendicular to shaft 12. To take shaft readings on shaft 2 I place a staight edge 70 against face 62. Since face 62 is parallel to shaft 12, straight edge 70 is also parallel to shaft 12. Then, I take my shaft reading using a feeler gauge 71 between straight edge 70 and top face 52 which is parallel to shaft 2. A reading on shaft 12 can be taken in a similar manner using straight edge 72 and feeler gauge 73. Face readings can be made using leg 74 which is attached at a right angle to straight edge 72. That leg would, of course, be parallel to faces 55, 56, 57 and 58 and is perpendicular to shaft 2. A feeler gauge 75 is used to measure the gap between leg 74 and face 67.

In FIG. 8 I have used a straight edge to define a line parallel to each shaft. It is also possible to use a light beam to define this line. A light source could be mounted on the first shaft to direct a light beam to a sensor on the second shaft. The distance of the light beam from the first shaft and the distance of the same beam from the second shaft could be used to calculate offset and angularity.

Light sensors and other electronic measuring devices could also be used in place of the feeler gauges shown in FIG. 8. All that is necessary is that the device be capable of measuring the distance between lines parallel or perpendicular to the coupled shafts. In FIG. 8 those lines are defined by the straight edges 70 and 72, leg 74 and the faces of clamps 22 and 24.

Example I

A motor operating at 1750 rotations per minute is coupled to a pump through a flexible coupling. Through experience I have found that an angularity value greater than 0.0005 inches per inch will substantially reduce the life of the coupling and offset values greater than 0.003 correspond to similar life reductions. Therefore, I want to achieve an alignment with lower offset and angularity values. For a particular motor and pump arrangement I set my gauges as shown in FIG. 2. Then I collected the following data:

$r_6 = -0.010''$; $r_{16} = +0.030''$; $D = 10''$ and $F = 24''$ $$r_6 = -.010''; r_{16} = +.030''; D = 10'' \text{ and } F = 24''$$

$$\text{Thus, Angularity} = \frac{-.010 + .030}{20} = +.001''/\text{inch}$$

$$\text{Offset} = \frac{(-.010 + .030)24}{20} - \frac{.030}{2} = .009''$$

Both values are unacceptable. Therefore, I must shim the pump or the motor and take new readings. Moving the gauges will not change the result. For the same coupling I set my gauges as shown in FIG. 3 then I collected this date: $r_7 = 0.030''$; $r_{17} = 0.005''$; $I = 6''$ and $G = 5''$. Now:

$$\text{Angularity} = \frac{.005''}{5''} = .001''/\text{inch}$$

$$\text{Offset} = \frac{.030}{2} - \frac{(.005)(6)}{5} = .009''$$

Next I changed the gauge set-up to look like FIG. 4. I found $r_7 = 0.030$; $r_{19} = 0.003$; $I = 6''$ and $H = 3''$; and $$\text{Offset} = \frac{.030}{2} - \frac{(.003)(6)}{3} = .009''$$

Using the arrangement of FIG. 5 I found $r_{36} = -0.010''$; $r_{37} = 0.003$; $J = 3$ and $K = 4$. Then:

$$\text{Offset} = \frac{(.003)(4)}{3} - \frac{-.010}{2} = .009''$$

Finally, I set the gauges as shown in FIG. 6. With this set-up I found $r_{38} = 0.005''$; $r_{36} = -0.010''$; $K = 4$ and $L = 5$. Then:

$$\text{Offset} = \frac{(.005)(4)}{5} - \frac{-.010}{2} = .009''$$

All of the set-ups yield the same values for angularity and the same values for offset. Unlike the prior art method changing the position of the gauges does not change the result. Therefore, tolerances can be set and when they are met one can reasonably expect to have an acceptable alignment.

Example II

I have found that different tolerances are needed when the motor runs at a faster speed. For a motor operating at 3600 rotations per minute angularity should not be greater than 0.00025 and offset should not exceed 0.002. For a particular 3600 rpm motor coupled to a pump, I set my gauges as shown in FIG. 2. I then collected the following data:

$r_6 = -0.020''$; $r_{16} = +0.022''$; $D = 5''$ $F = 2$

Thus, Angularity $= \dfrac{-.020 + .022}{10} = +.0002/\text{inch}$

Offset $= \dfrac{(-.020 + .022)2}{10} - \dfrac{.022}{2} = .0106$

Here I have acceptable angularity but unacceptable offset. I must therefore move or shim either the pump or motor and take new readings.

While I have shown and described certain present preferred methods of practicing the invention, it is to be distinctly understood that the invention is not limited thereto but it be variously practiced within the scope of the following claims.

I claim:

1. A method for determining alignment of a first shaft and a second shaft coupled together by a coupling comprising the steps of:
   a. suspending a first dial indicator gauge having a pin type contact over the second shaft so that its pin type contact abuts one of the second shaft and a portion of the coupling generally parallel to the second shaft;
   b. suspending a second dial indicator gauge having a pin type contact over the first shaft so that its pin type contact abuts one of the first shaft and a portion of the coupling generally parallel to the first shaft;
   c. taking a reading $r_1$ on the first dial indicator gauge;
   d. taking a reading $r_2$ on the second indicator gauge;
   e. measuring the horizontal distance $d_1$ between the first gauge and the second gauge;
   f. determining angularity between the first shaft and the second shaft by solving:

Angularity $= (r_1 + r_2)/2d_1$;

and
   g. comparing the angularity to a predetermined set of acceptable angularity values.

2. The method of claim 1 also comprising the additional steps of:
   a. adjusting one of the first shaft and the second shaft;
   b. taking a reading $r_1$ on the first dial indicator gauge;
   c. taking a reading $r_2$ on the second indicator gauge;
   d. measuring a horizontal distance $d_1$ between the first gauge and the second gauge;
   e. determining angularity between the first shaft and the second shaft by solving:

Angularity $= (r_1 + r_2)/2d_1$;

and
   f. comparing the angularity to a predetermined set of acceptable angularity values.

3. The method of claim 1 also comprising the additional steps of:
   a. defining a coupling centerline through the coupled shafts;
   b. measuring a distance $d_2$ from the centerline to one of the first dial indicator and the second dial indicator;
   c. determining offset between the first shaft and the second shaft by solving:

Offset $= \dfrac{r_1}{2} - \dfrac{(r_1 + r_2)d_2}{2d_1}$; and d. comparing the offset a predetermined set of acceptable offset values.

4. The method of claim 3 also comprising the additional step of:
   a. adjusting one of the first shaft and the second shaft, and
   b. taking a reading $r_1$ on the first dial indicator gauge;
   c. taking a reading $r_2$ on the second indicator gauge;
   d. measuring a horizontal distance $d_1$ between the first gauge and the second gauge;
   e. defining a coupling centerline through the coupled shafts;
   f. measuring a distance $d_2$ from the centerline to one of the first dial indicator and the second dial indicator;
   g. determining offset between the first shaft and the second shaft by solving:

Offset $= \dfrac{r_1}{2} - \dfrac{(r_1 + r_2)d_2}{2d_1}$; and f. comparing the offset to a predetermined set of acceptable offset values.

5. A method for determining alignment of a first shaft and a second shaft coupled by a coupling together comprising the steps of:
   a. attaching to the first shaft a first clamp having a top parallel to the first shaft;
   b. attaching to the second shaft a second clamp having a top parallel to the second shaft;
   c. suspending a first dial indicator gauge having a pin type contact from the first clamp over the top of the second clamp so that its pin type contact abuts one of the top of the second clamp, the second shaft, and a portion of the coupling generally parallel to the second shaft;
   d. suspending a second dial indicator gauge having a pin type contact from the second clamp over the top of the first clamp so that its pin type contact abuts one of the top of the first clamp, the first shaft and a portion of the coupling generally parallel to the first shaft;
   e. taking a reading $r_1$ on the first dial indicator gauge;
   f. taking a reading $r_2$ on the second indicator gauge;
   g. measuring a horizontal distance $d_1$ between the first gauge and the second gauge;
   h. determining angularity between the first shaft and the second shaft by solving:

Angularity $= (r_1 + r_2)/2d_1$;

and
   i. comparing the offset to a predetermined set of acceptable offset values.

6. A method of determining alignment of a first shaft and a second shaft coupled together comprising the steps of:
   a. attaching to the first shaft a first clamp;
   b. attaching to the second shaft a second clamp having a top parallel to the second shaft and a face perpendicular to the second shaft;
   c. suspending first and second dial indicator gauges each having a pin type contact from the first clamp over the second clamp in a manner so that the contact of the first gauge abuts the top of the second clamp and the contact of the second gauge abuts the face of the second clamp;

d. measuring a diameter D of a circle through which the second gauge would travel if rotated about the second shaft;

e. taking a reading $r_1$ on the second gauge;

f. determining angularity between the first shaft and the second shaft by solving:

Angularity = $r_1$/D;

and g. comparing the angularity to a predetermined set of acceptable angularity values.

7. The method of claim 6 also comprising the additional steps of:

a. adjusting one of the first shaft and the second shaft, b. measuring a diameter D of a circle through which the second gauge would travel if rotated about the second shaft;

c. taking a reading $r_1$ on the second gauge;

d. determining angularity between the first shaft and the second shaft by solving:

Angularity = $r_1$/D;

and e. comparing the angularity to a predetermined set of acceptable angularity values.

8. The method of claim 6 also comprising the additional steps of:

a. defining a coupling centerline through the coupled shafts;

b. measuring a distance d from the centerline to the first dial indicator gauge;

c. taking a reading $r_2$ on the first gauge, d. determining offset between the first shaft and the second shaft by solving:

Offset = ($r_2$/2) − ($r_1$d/D);

and e. comparing the offset to a predetermined set of acceptable offset values.

9. The method of claim 8 also comprising the additional steps of:

a. adjusting the position of one of the first shaft and the second shaft;

b. measuring a diameter D of a circle through which the second gauge would travel if rotated about the second shaft;

c. taking a reading $r_1$ on the second gauge;

d. determining angularity between the first shaft and the second shaft by solving:

Angularity = $r_1$/D e. defining a coupling centerline through the coupled shafts;

f. measuring a distance d from the centerline to the first dial indicator;

g. taking a reading $r_2$ on the first gauge;

h. determining offset between the first shaft and the second shaft by solving:

Offset = ($r_2$/2) − ($r_1$d/D);

and i. comparing the offset to a predetermined set of acceptable offset values.

10. A method of determining alignment of a first shaft and a second shaft coupled by a coupling having a face generally perpendicular to the second shaft together comprising the steps of:

a. suspending a first and second dial indicator gauges each having a pin type contact over the second shaft in a manner so that the contact of the first gauge abuts one of the second shaft and a portion of the coupling generally parallel to the second shaft and the contact of the second gauge abuts the coupling face;

b. meauring a diameter D of a circle through which the second gauge would travel if rotated about the second shaft;

c. taking a reading $r_1$ on the second gauge;

d. determining angularity between the first shaft and the second shaft by solving:

Angularity = $r_1$/D;

and e. comparing the angularity to a predetermined set of acceptable angularity values.

11. A method for determining alignment of a first shaft and a second shaft together comprising the steps of:

a. attaching to the first shaft a first clamp having a face perpendicular to the first shaft;

b. attaching to the second shaft a second clamp having a top parallel to the second shaft and a face perpendicular to the second shaft;

c. suspending from the first clamp a first dial indicator gauge having a pin type contact over the second clamp so that the contact of the first gauge abuts the top of the second clamp;

d. suspending from the second clamp a second dial indicator having a pin type contact over the first clamp so that the contact of the second gauge abuts the face of the first clamp;

e. measuring a diameter D of a circle through which the second gauge would travel if rotated about the first shaft;

f. taking a reading $r_1$ on the first gauge;

g. taking a reading $r_2$ on the second gauge;

h. defining a centerline through the coupled shafts;

i. measuring a distance C from the centerline to the first dial indicator;

j. determining offset between the first shaft and the second shaft by solving:

Offset = ($r_2$C/D) − ($r_1$/2;

and k. comparing the offset to a predetermined set of acceptable offset values.

12. The method of claim 11 also comprising the additional steps of:

a. adjusting the position of one of the first shaft and the second shaft;

b. measuring a diameter D of a circle through which the second gauge would travel if rotated about the first shaft;

c. taking a reading $r_1$ on the first gauge;

d. taking a reading $r_2$ on the second gauge;

e. defining a centerline through the coupled shafts;

f. measuring a distance C from the centerline to the first dial indicator;

g. determining offset between the first shaft and the second shaft by solving:

Offset = $(r_2 C/D) - (r_1/2)$;

and h. comparing the offset to a predetermined set of acceptable offset values.

13. The method for determining alignment of a first shaft and a second shaft coupled together by a coupling having at least one first face generally perpendicular to the first shaft comprising the steps of:

a. suspending a first dial indicator gauge having a pin type contact over the second shaft to that the contact of the first gauge abuts one of the second shaft and a portion of the coupling generally parallel to the second shaft;

b. suspending a second dial indicator having a pin type contact over the first shaft so that the contact of the second gauge abuts the first face of the coupling;

c. measuring a diameter D of a circle through which the second gauge would travel if rotated about the first shaft;

d. taking a reading $r_1$ on the first gauge;

e. taking a reading $r_2$ on the second gauge;

f. defining a centerline through the coupled shafts;

g. measuring a distance C from the centerline to the first dial indicator;

h. determining offset between the first shaft and the second shaft by solving:

Offset = $(r_2 C/D) - (r_1/2)$;

and i. comparing the offset to a predetermined set of acceptable offset values.

14. A method for determining alignment of a first shaft and a second shaft coupled together comprising the steps of:

a. defining a first line parallel to the first shaft;

b. defining a second line parallel to the second shaft;

c. measuring a distance $r_1$ between the first line and a first point on the second line;

d. measuring a distance $r_2$ between the first line and a second point on the second line;

e. measuring a distance $d_1$ between the first point and the second point, f. determining angularity between the first shaft and the second shaft by solving:

Angularity = $(r_1 + r_2)/2d_1$;

and g. comparing the angularity to a set of acceptable angularity values.

15. The method of claim 14 also comprising the steps of:

a. defining a coupling centerline through the coupled shafts;

b. selecting the first point and the second point so that they are on opposite sides of the centerline;

c. measuring a distance $d_2$ from the centerline to one of the first point and the second point, d. determining offset between the first shaft and the second shaft by solving:

$$\text{Offset} = \frac{r_1}{2} - \frac{(r_1 + r_2)d_2}{2d_1} ; \text{ and}$$

e. comparing the offset to a set of acceptable offset values.

16. The method of claim 14 wherein a straight edge is used to define the first parallel line and the second parallel line and feeler gauges are used to measure distances $r_1$ and $r_2$.

17. A method for determining alignment of a first shaft and a second shaft coupled together comprising the steps of:

a. defining a first line prependicular to the first shaft;

b. defining a second line perpendicular to the second shaft;

c. measuring a distance $r_1$ between a point P on the first line and the second line;

d. measuring a diameter D of a circle through which point P would travel if rotated about the second shaft, e. determining angularity between the first and second shaft by solving:

Angularity = $r_1/D$;

and f. comparing the angularity to a set of accetable angularity values.

18. The method of claim 17 also comprising the additional steps of:

a. defining a coupling centerline through the coupled shafts;

b. defining a third line parallel to the first shaft;

c. defining a fourth line parallel to the second shaft;

d. measuring a distance $r_2$ from a point P on the third line to the fourth line;

e. measuring a distance d from point P to the coupling centerline, f. determining offset between the first shaft and the second shaft by calculating a difference between $r_2/2$ and $r_1 d/D$;

and g. comparing the offset to a set of acceptable offset values.

* * * * *

UNITED STATES PATENT AND TRADEMARK OFFICE
CERTIFICATE OF CORRECTION

PATENT NO. : 4,586,264
DATED : May 6, 1986
INVENTOR(S) : JOHN M. ZATEZALO

It is certified that error appears in the above-identified patent and that said Letters Patent is hereby corrected as shown below:

In [57] Abstract, line 1, change "specificatin" to --specification--.

Column 8, line 17, "$r_6 = -.010$"; $r_{16} = +.030$"; D = 10" and F = 24" " is repeated. Please delete first instance.

Column 10, line 5, after "offset" insert --to--.

Column 10, line 8, change "step" to --steps--.

Column 12, line 15, change "meauring" to --measuring--.

Column 12, line 28, after "shaft" insert --coupled--.

Column 13, line 11, change "The" to --A--.

Column 14, line 38, change "accetable" to --acceptable--.

Signed and Sealed this

Thirtieth Day of September 1986

[SEAL]

Attest:

DONALD J. QUIGG

Attesting Officer

Commissioner of Patents and Trademarks